H. E. HEATH.
PULSAMETER.
APPLICATION FILED SEPT. 24, 1908.
1,010,757.
Patented Dec. 5, 1911.
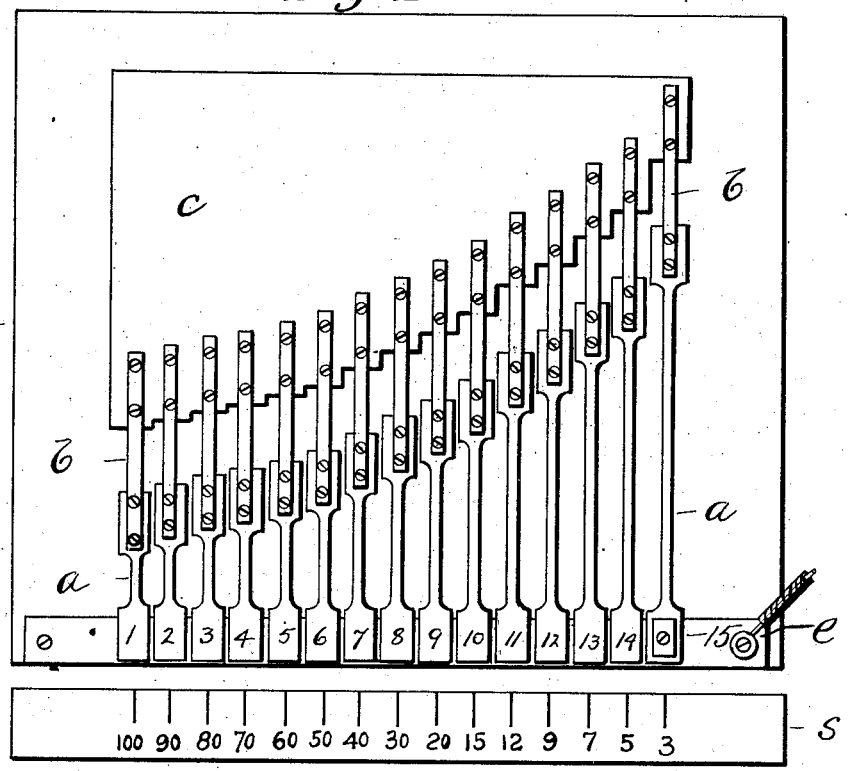
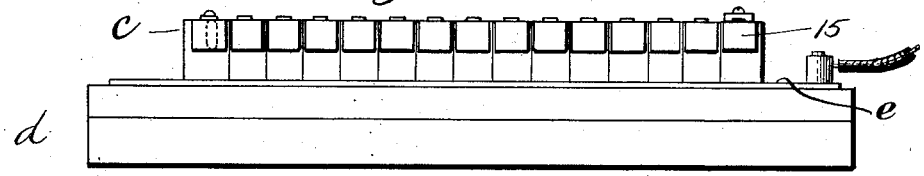
WITNESSES:
INVENTOR.
Harry E. Heath
BY
ATTORNEY.

UNITED STATES PATENT OFFICE.

HARRY E. HEATH, OF HARTFORD, CONNECTICUT.

PULSAMETER.

1,010,757.   Specification of Letters Patent.   Patented Dec. 5, 1911.

Application filed September 24, 1908. Serial No. 454,526.

*To all whom it may concern:*

Be it known that I, HARRY E. HEATH, a citizen of the United States, and a resident of Hartford, in the county of Hartford and State of Connecticut, have invented certain new and useful Improvements in Pulsameters, of which the following is a specification.

The object of the invention is to provide means for measuring the rate of pulsation of electric currents.

The apparatus is designed particularly to measure the rate of pulsations in currents produced by static machines when there is a proper balance of capacity and inductance in other circuits.

Figure 1 of the drawings shows a plan view of one embodiment of my invention. Fig. 2 shows an edge view thereof. Fig. 3 shows a detail of one of the recording members.

I will describe my invention as used in connection with a static electric machine equipped with condensers in the form of Leyden jars connected up in the proper manner. In such a machine the charge is built up in the jaws until it is of sufficient strength to discharge across from one terminal to the other, a new charge immediately gathering again in the Leyden jar and being discharged in the same way. These discharges or pulsations of the current are at regular fixed intervals. It is of considerable importance in certain branches of work for which the electric currents, and particularly the currents generated in static machines, are used that the rate of pulsations of the current may be accurately measured.

In carrying out my invention I provide a number of vibrating members, 1, 2, 3, 4, 5, 6, 7, 8, etc., each one of which has a natural rate of vibration which can be readily determined, the rate of vibration of each of these members being different from that of the other members.

In the embodiment of the invention illustrated the vibrating members comprise bars $a$ mounted rigidly on the end of flat springs $b$, the other end of these springs being secured to the projection $c$ on the base $d$. These vibrating members vary in length as seen. The free ends of these arms stand a little away from the base, and that part of the base immediately under these free ends is preferably covered with a strip of metal $e$ so as to localize the charge. Provision is made for connecting this device to the circuit and preferably it is connected to one side of the circuit only and as the base is made from a material which is a fair conductor for the high potentials such as are generated in static and like machines the whole device is charged with electricity of the same sign. At each charge of the device the arms and the localizing strip on the base repel one another. The charging and discharging of the base occurs in unison with the pulsation of the current but for a certain rate of pulsation but one of the spring arms will be effected and it will be that arm whose natural rate of vibration coincides with the rate of pulsation; the particular arm affected will vibrate continuously and evenly and can readily be distinguished.

A scale $s$ is arranged opposite the ends of the spring arms and on this scale the natural rate of vibration of each spring arm is noted. When the apparatus is connected up in the circuit the rate of pulsation of the current can be determined by noting the spring arm whose natural rate of vibration coincides with the pulsations of the current and reading on the scale of its vibration, which will be the rate of pulsation of the current.

I am aware that various changes in the structure and arrangement of the parts of this device can be made without departing from the spirit of my invention.

I claim:—

1. A device for measuring the rate of pulsation of an electric current comprising, a series of vibrating members having different natural rates of vibration, a coöperating member, and means for connecting said members to the pulsating circuit.

2. A device of measuring the rate of pulsation of an electric current comprising, a series of spring arms having different natural rates of vibration, a coöperating member, and means for connecting said members to the pulsating circuit.

3. A device of measuring the rate of pulsation of an electric current comprising, a base having a projection, a series of spring arms of varying lengths secured to said projection with their free ends in operative relation to said base, and means for connecting said base and arms to the pulsating circuit.

4. A device for measuring the rate of pulsation of an electric current comprising, a base having a projection, a series of spring arms of varying lengths secured to said projection with their free ends in operative relation to said base, a localizing strip secured to said base beneath the free ends of said arms, and means for connecting said base and arms to the pulsating circuit.

HARRY E. HEATH.

Witnesses:
D. I. KREIMENDAHL,
H. E. HART.